May 13, 1958  H. S. BRUNDAGE  2,834,078
CORD STORAGE DEVICE
Filed July 2, 1954

*INVENTOR.*
Helen S. Brundage
BY
Horace B. Van Valkenburgh
*ATTORNEY*

United States Patent Office 2,834,078
Patented May 13, 1958

2,834,078

CORD STORAGE DEVICE

Helen S. Brundage, Aurora, Colo.

Application July 2, 1954, Serial No. 441,009

3 Claims. (Cl. 24—71.2)

This invention relates to cord storage devices, and more particularly to devices for storing an excess length of an electrical cord or the like.

When lamps, radio sets and the like are connected to an electrical outlet, often the distance between the lamp or the like and the outlet is much less than the length of the cord which is used. Also, it frequently happens that when an extension cord is used, the cord is considerably longer than the distance over which it is to extend. Excess lengths of cord are often stuffed under furniture, but an adequate storage place for excess cord is not always available under furniture. Or, excess lengths of cord may be doubled up along a base board, or merely left to lie on the floor. Such excess lengths of cord are unsightly, as well as providing possible hazards to those using the room in which the cord is placed, such as the hazard involved in a person tripping over the excess length of cord. Furthermore, an excess length of cord often becomes displaced from the position in which it was placed originally. It is inconvenient and often impossible to select a cord which has the exact length desired, while it is uneconomical to cut down a cord each time it is found that it is longer than the distance over which it is to extend. Also, lamps, radio sets and other electrical devices are quite often changed in position from one place to another, as in a room, and often the cord has approximately the desired length for one location of the electrical device, but is much longer than is necessary for another position of the electrical device. Sometimes, knots or loops are tied in the cord, but these can create as much of a hazard as if the cord were left lying loose.

Among the objects of the present invention are to provide a novel cord storage device; to provide such a cord storage device which is particularly adapted to store excess or unused portions of an electrical cord or the like; to provide such a device which requires a minimum of time to place a length of cord therein; to provide such a device which can be readily opened to permit an additional length of cord to be stored therein or a portion of the cord stored therein to be removed; to provide such a device which can readily be closed again after the length of cord stored therein has been changed; to provide such a device which can be placed in any desired position along the entire length of the cord; to provide such a device which requires no electrical connections; to provide such a device which occupies a minimum of space and may be made so that an unsightly appearance will not be produced; to provide such a device which is comparatively simple in construction and readily manufactured; and to provide such a device which is effective and adequate in operation.

Additional objects and the novel features of this invention will become apparent from the description which follows, taken in connection with the accompanying drawing, in which.

Figure 4:
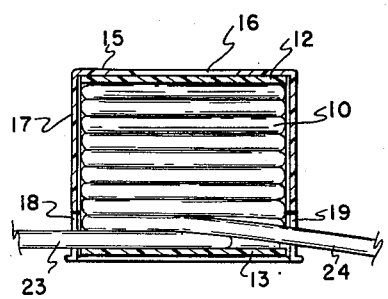
Fig. 4 is a side elevation of the device with a length of cord stored therein, a housing which comprises the outer portion of the device being shown in central vertical section, as in Fig. 3.

As illustrated in the drawing, a cord storage device constructed in accordance with this invention may comprise an inner spool S and an outer housing H, between which a length of cord 10 may be stored, as in Fig. 4. Spool S includes a central post 11 and a circular flange extending radially from the respective ends of the post 11, such as an upper flange 12 and a lower flange 13. The spool S may be formed in one piece, and flanges 12 and 13 thus being integral with the post 11, as by molding a suitable plastic composition, such as a suitably colored polystyrene, although other plastics, such as a ureaformaldehyde resin, cellulose acetate, vinyl chloride, or a vinyl chloride-vinyl acetate copolymer, may be utilized.

Figure 1:
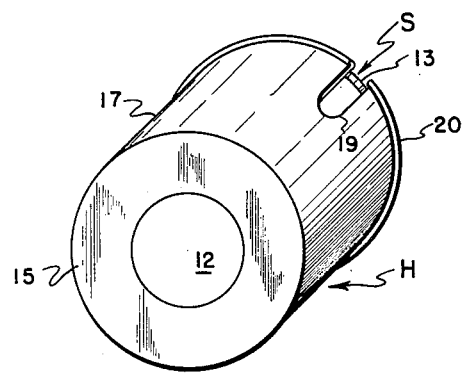
Fig. 1 is a perspective view of a cord storage device constructed in accordance with this invention.
Figure 2:
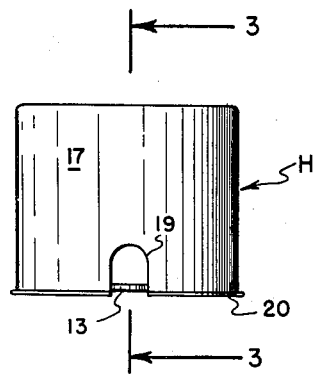
Fig. 2 is a side elevation thereof.
Figure 3:
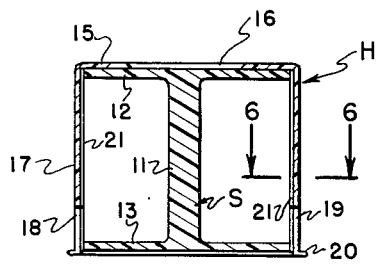
Fig. 3 is a central vertical section taken along line 3—3 of Fig. 2.
Figure 5:
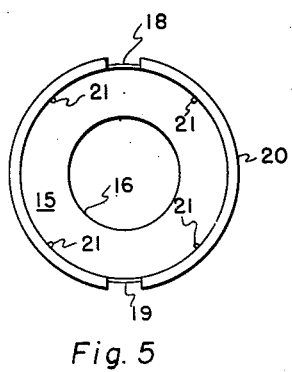
Fig. 5 is a bottom plan view of the housing.
Figure 6:
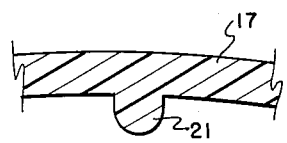
Fig. 6 is an enlarged fragmentary transverse section, as along line 6—6 of Fig. 3, illustrating more clearly one of a number of ribs which are preferably formed on the inside of the housing wall.

Housing H is conveniently formed in one piece, as by molding and from the same material as the spool, the housing H being conveniently cylindrical in shape and having an open bottom, a top 15 which may be imperforate except for a circular central aperture or opening 16, and an annular side wall 17 having a diameter corresponding to the diameter of the flanges 12 and 13 of the spool. Aperture 16 in the housing top permits pressure to be exerted against the top flange 12 of the spool, to force the spool out of the housing. At its lower end, the side wall 17 of the housing is provided with a pair of diametrically opposed slots 18 and 19 which communicate with the open bottom of the housing and which have a size sufficient to accommodate the largest cord intended to be stored in the device. For reinforcement and other purposes, the lower edge of the housing side wall 17 may be provided with a small, outwardly extending bead 20. Bead 20 is adapted to cooperate with an opening in a display formed of cardboard or the like, to attach one or more devices to the cardboard or the like, for sales purposes. Also, bead 20 may be gripped when pressure is exerted through aperture 16 against the upper flange 12 of the spool in removing the spool from the housing, although the outside of the housing may more often be gripped. Preferably, the inside of the wall 17 of the housing, as in Figs. 3, 5 and 6, is provided with a plurality of radially spaced, axially extending ribs 21 which may have any desired configuration, such as arcuate, as shown in Fig. 6. These ribs 21 engage the peripheral edges of the spool flanges 12 and 13, the diameter of the spool flanges preferably being such that some friction is produced in pressing the spool into the housing, so that the spool will be maintained in the housing through frictional engagement, particularly with top flange 12 of the spool. If desired, each rib 21 may terminate a short distance above the lower end of the housing, but the ribs 21 preferably extend substantially the full height of the housing, since after the spool has moved only a short distance into the housing, the engagement of the upper flange 12 of the spool with the ribs 21 will tend to hold the spool in the radial position in which it is inserted in the housing, thus preventing the spool from turning within the housing.

As in Fig. 4, a length 10 of cord may be wound about the spool S, so that the outermost layers do not extend beyond the outer edges of the flanges 12 and 13, with the ends 23 and 24 of the desired length of cord extending outwardly from the spool. After the cord is wound onto the spool, the spool and length of cord wound thereon is inserted within the housing.

As will be evident, when the desired length of cord has been wound onto the spool S, the housing may merely be placed thereover and the ends 23 and 24 of the stored cord length pushed into the slots 18 and 19, respectively, as the spool finally enters the housing. If it is necessary to shift either or both cord length ends 23 or 24 to cause them to register with the respective slots 19 and 20, the frictional engagement between flange 12 of the spool and ribs 21 of the housing will prevent the spool from turning in the housing, as indicated previously, while this is being done. When the spool S is completely within the housing H, the lower flange 13 of the spool closes the open bottom of the housing, while the upper flange 12 of the spool closes the aperture 16 in the top of the housing. Thus, the device substantially completely encloses the stored length of cord. The slots 18 and 19 hold the cord ends 23 and 24 in position, so that the disposition of the wound layers of the stored length 10 of the cord will not be disturbed during use. Also, if the stored length 10 of the cord is wound even loosely on the spool, the slots 18 and 19 hold the respective ends 23 and 24 and tend to prevent any cord from being withdrawn from the device. Thus, the stored portion of the cord is maintained in its position as wound onto the spool, so that if the spool is removed to wind an additional length of cord, there are no kinks or tangled loops to cause difficulty.

Although the post 11 of the spool is preferably cylindrical and the flanges 12 and 13 thereof are preferably circular, while the housing H is preferably cylindrical in shape, since such shapes are more convenient than others to form by molding, it will be understood that the spool flanges and housing may have other shapes, such as hexagonal, octagonal, rectangular and the like. Of course, the lower spool flange should have the same shape as the open bottom of the spool, in order to close the same when the spool and housing are assembled with a length of cord therein, while the upper spool flange should have the same shape as the inside of the housing, or at least a shape such that it will necessarily engage the ribs 21 when the latter are utilized. While the slots 18 and 19 for the cord ends extending from the device may be placed in other positions, the diametrically opposed positions for the slots is preferable, since then the cord end 23 leading to the device, for instance, will be opposite the cord end 24, leading from the device and the device will be automatically placed in the line of the run of the cord. Thus, such diametrically opposed slots tend to insure that the device will lie flat on its base and will not tend to move from that position, since lateral torque does not tend to be produced on the device if either of the cord ends 23 or 24 is accidentally pulled.

It will be understood, of course, that the cord storage device of this invention may be made of materials other than plastic, although plastic material is preferable, since it is readily molded to shape, is relatively cheap and also is an electrical insulator in and of itself.

From the foregoing, it will be evident that a cord storage device, constructed in accordance with this invention, fulfills to a marked degree the requirements and objects hereinbefore set forth. The spool and the housing are readily assembled and disassembled, while an excess length of cord can be stored therein, is readily wound onto the spool, and the extending ends of the cord are easily and readily placed in the slots adapted to receive them.

Although a preferred embodiment of this invention has been illustrated and described and certain variations therein indicated, it will be understood that other embodiments may exist and various other changes made, all without departing from the spirit and scope of this invention.

What is claimed is:

1. A cord storage device, comprising a spool having a central post and upper and lower circular flanges attached to and extending radially from the upper and lower ends of said post; and a cylindrical housing having an inside diameter corresponding to the diameter of said spool flanges and a height corresponding to the height of said spool, said housing having an open bottom adapted to be closed by the lower flange of said spool when said spool is inserted in said housing and a top which is imperforate except for a centrally disposed, circular opening through which pressure may be applied to the upper flange of said spool for pushing said spool out of said housing, said housing also having an annular side wall provided at its lower edge with upwardly extending slots disposed in diametrically opposite positions and communicating with the open bottom of said housing, said slots having a width and height sufficient to accommodate a cord passing into said housing through one slot and out of said housing through the opposite slot, said side wall of said housing having a plurality of longitudinally extending ribs on the inside theerof, said ribs extending substantially the full height of said housing and being substantially semi-circular in cross section and being adapted to frictionally engage said spool flanges, to retain said spool in said housing and oppose turning of said spool in said housing, whereby a length of cord may be wound on said spool with the opposite ends of such cord length extending outwardly from said spool and said spool with such length of cord wound thereon may be inserted within said housing so that said spool is enclosed by said housing with said ends of such length of cord extending through said slots.

2. A cord storage device comprising a spool having a central post and upper and lower flanges attached to and extending radially from the upper and lower ends of said post; a housing having an inside shape corresponding to the shape of said spool flanges and a height corresponding to the height of said spool, said housing having an open bottom adapted to be closed by the lower flange of said spool when said spool is inserted in said housing and a top which is provided with an opening through which pressure may be applied to the upper flange of said spool for pushing said spool out of said housing, said housing also having a side wall provided with upwardly extending slots communicating with the open bottom of said housing, said slots having a width and height sufficient to accommodate a cord passing into said housing through one slot and out of said housing through the opposite slot, whereby a length of cord may be wound on said spool with the opposite ends of the cord length extending outwardly from said spool and said spool with such length of cord wound thereon may be inserted within said housing so that said spool is enclosed by said housing with said ends of such length of cord extending through said slots; and frictional interengaging means formed by the inside of said housing and at least the upper flange of said spool for holding said spool in said housing.

3. A cord storage device, as defined in claim 2, wherein said frictional interengaging means comprise longitudinally extending ribs on the inside of said housing.

References Cited in the file of this patent

UNITED STATES PATENTS

| | | |
|---|---|---|
| 2,429,675 | Eypper | Oct. 28, 1947 |
| 2,449,464 | Eypper | Sept. 14, 1948 |
| 2,656,991 | Neely | Oct. 27, 1953 |